United States Patent [19]
Paul, Jr.

[11] Patent Number: 4,881,420
[45] Date of Patent: Nov. 21, 1989

[54] POWER ACTUATOR WITH LOST MOTION ARRESTER

[76] Inventor: Herman L. Paul, Jr., 370 Dogwood La., R.D. 5, Lebanon, Pa. 17042

[21] Appl. No.: 279,655

[22] Filed: Dec. 5, 1988

[51] Int. Cl.$^4$ ............................................. F16K 31/163
[52] U.S. Cl. ....................................... 74/109; 74/530; 92/136; 251/248
[58] Field of Search ................ 74/109, 530; 92/136, 92/138; 251/63.4, 248

[56] References Cited

U.S. PATENT DOCUMENTS

| | | |
|---|---|---|
| 2,166,975 | 7/1939 | Sologaistoa . |
| 2,754,687 | 7/1956 | Brandon . |
| 2,775,128 | 12/1956 | Young . |
| 2,777,427 | 1/1957 | Nichols ............................ 92/136 X |
| 3,583,247 | 6/1971 | Paul, Jr. . |
| 3,709,106 | 1/1973 | Shafer . |
| 4,100,816 | 7/1978 | Clark ............................... 92/136 X |
| 4,133,215 | 1/1979 | Norris et al. . |
| 4,186,613 | 2/1980 | Carlson, Jr. . |
| 4,392,631 | 7/1983 | DeWald ........................... 92/138 X |
| 4,504,038 | 3/1985 | King . |
| 4,520,994 | 6/1985 | DeWald ........................... 92/138 X |
| 4,533,113 | 8/1985 | Francart, Jr. ..................... 251/63.4 |

Primary Examiner—Peter R. Brown
Attorney, Agent, or Firm—Samuel M. Learned, Jr.

[57] ABSTRACT

An improved power actuator with lost motion arrester for coupled use in accomplishing remote control, set, and set hold of rotary flow control valve adjustments wherein the lost motion arrester component is comprised of a circular rack and pinion timing gear assembly that functions to allow smooth mechanical operation during displacement of the power actuator to accomplish valve adjustment, but upon any valve adjustment set stop instantaneously provides in coupled combination with the power actuator assembly a positive mechanical lock and hold function in arresting the lost motion action by which operational adjustment and set of the power actuator mechanism is made.

5 Claims, 3 Drawing Sheets

4,881,420

POWER ACTUATOR WITH LOST MOTION ARRESTER

BACKGROUND OF THE INVENTION

The present invention relates to a power actuator embodying the type of mechanism per se taught and claimed in the instant inventor's previous U.S. Pat. No. 3,583,247 dated June 8, 1971, covering a "Power Actuator For Rotary Valves", and in particular is an improvement to provide in combination therewith a positive mechanical lock and hold function of the lost motion action by which operational adjustment and set of that mechanism is made when utilized in the highly specialized employment as a power actuator for remotely located high pressure and high volume flow control valves such as would be found in cooling system application for naval nuclear power plants and the like.

The continued use of quarter-turn full open-to-close fluid flow control devices such as ball, plug, and butterfly valves in both industrial and maritime applications in removed limited space locations requiring remote operation of a coupled power actuator to adjust the valve remains a much needed mechanical control function capability, as well as the need for highly compact and efficient power actuators that will hold and maintain the valve set once adjusted and not allow drift to a more open or closed position than that set to achieve the desired flow rate. It is through the incorporation of a circular rack and pinion timing gear assembly in combination with applicant's previously patented Power Actuator For Rotary Valves that provides the mechanical means whereby the power actuator lost motion movement after adjustment is positively arrested and there is no further movement thereof from vibration effects or fluid flow force effects, wherein the combination enables positive operational maintenance of valve set adjustment in the typical use application environment.

The applicant's previously cited power actuator device, in the use envisioned, was employed to convert rectilinear piston motion to rotary motion, however the device is equally adaptable for converting rotary motion to rectilinear motion. Another such device, although not suitable for quarter-turn high pressure valve set and control operations, is that as taught by Young in his U.S. Pat. No. 2,775,128 dated Dec. 25, 1956, which is for an apparatus to change rotary motion to rectilinear motion by means of a mechanical assembly somewhat similar functionally but structurally distinguished from that of applicant's previously Patented power actuator.

Additional teachings showing the use of circular rack and pinion timing gear means in lineal to rotary motion conversion devices and apparatus for purposes respectively of enhancing operational stability and control, for mechanical set and lock, and operational utilization in a valve operator of alternate mechanical function are as in turn respectively set forth in U.S. Pat. No. 2,166,975 to Sologaistoa dated July 25, 1939, in U.S. Pat. No. 2,754,687 to Brandon dated July 17, 1956, and in U.S. Pat. No. 4,186,613 to Carlson, Jr., dated Feb. 5, 1980.

Other linear to rotary motion converters of interest for operation and set of fluid control valves, but operable on mechanical assemblies and linkages distinguished from that utilized by applicant, are exemplified by the teachings respectively set forth in U.S. Pat. No. 3,709,106 to Shafer dated Jan. 9, 1973, in U.S. Pat. No. 4,133,215 to Norris et al dated Jan. 9, 1979, and in U.S. Pat. No. 4,504,038 to King dated Mar. 12, 1985.

SUMMARY OF THE INVENTION

It is the principal object of the present invention to provide an improved power actuator with lost motion arrester which is suitable for employment as a rotary flow control valve control and adjustment device in use application on remotely located high pressure and high volume flow control valves such as would be found in cooling system loops for naval nuclear power plants and the like, so that upon accomplishment of any valve set adjustment by means of the power actuator there is thereupon an instantaneous and automatic power actuator assembly positive mechanical lock and hold function and thereafter no drift of the valve set to a more open or closed position than that set to achieve the desired flow rate.

It is another object of the present invention to provide an improved power actuator with lost motion arrester wherein the lost motion arrester component is comprised of a circular rack and pinion timing gear assembly.

Yet another object of the present invention is to provide an improved power actuator with lost motion arrester that is optimaly sized for the amount of work it is capable of performing.

A further object of the present invention is to provide a power actuator with lost motion arrester that is simple in design, rugged in construction, and economical to manufacture.

The foregoing, and other objects hereof, will be readily evident upon a study of the following specification and accompanying drawings comprising a part thereof.

DETAILED DESCRIPTION OF THE INVENTION

Figure 1:
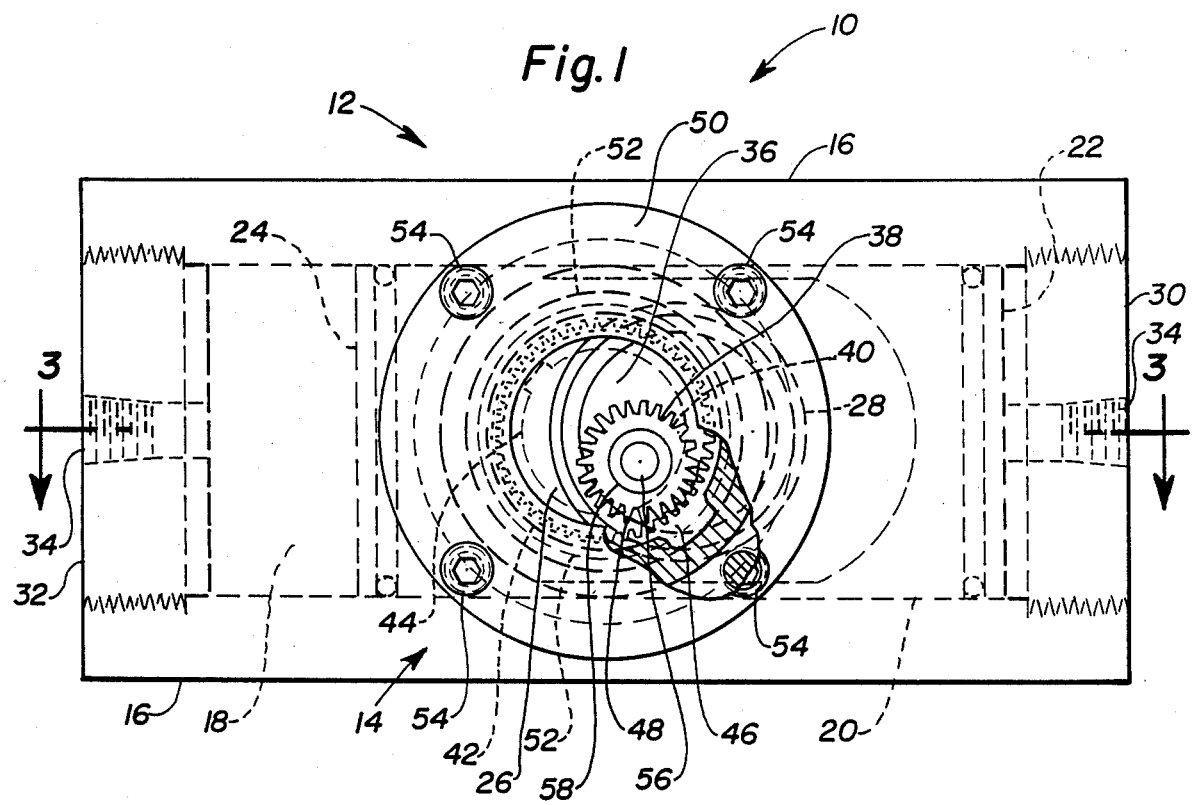
FIG. 1 is a front elevation view of the improved power actuator with lost motion arrester which comprises the instant invention, with a segment thereof broken away to better show details of the assembly combination.

Referring to FIG. 1, the improved power actuator with lost motion arrester 10 which comprises the instant invention is shown in a front elevation view with a segment thereof broken away to better show details of the power actuator 12 and lost motion arrester 14 assembly combination. The power actuator 12 as herein shown and as hereinafter described is structurally and functionally similar to that device as taught in applicant's previous U.S. Pat. No. 3,583,247 modified to accommodate mechanically combined installation of said lost motion arrester 14, and includes a body block 16 provided therethrough with a centrally located longitudinally extending cylindrical piston bore 18 adapted to receive for hydraulically operated reciprocally driven motion therewithin a double faced piston 20 having for purposes of discussion herein a right piston face 22 and a left piston face 24 connectably communicating from the non-piston face sides respectively thereof in rigid aligned longitudinal coaxial disposition one with the other by means of an integral interconnecting piston face web 26 provided with a centrally intermediate symetrically disposed piston web bore 28. The respective longitudinally disposed right and left ends of said cylindrical piston bore 18 are threadably sealed with a right bore closure plug 30 and a left bore closure plug 32 each in turn provided with a threaded opening 34 to receive hydraulic hoses for connection to a hydraulic fluid pressure system, not shown, for accomplishing the aforesaid hydraulically operated reciprocally driven motion of said double faced piston 20.

As also shown in the front elevation view of FIG. 1 are the primary functional components of the power actuator 12, being the integral interconnecting piston face web 26 of the double faced piston 20 by which rectilinear hydraulic driven piston motion is imparted to the motion converting rotor which rotates within the centrally intermediate symmetrically disposed piston web bore 28 and thereby converts rectilinear hydraulic driven piston motion to rotary motion that is then transmitted through the integrally extending eccentrically driven motion converting rotor drive lug 38 insertably communicating rotatably within the oscillatable valve stem coupling offset recess 40 whereby axially coincident rotary drive motion is imparted to the oscillatable valve stem coupling 42 for transmittal of that rotary motion to a valve stem, not shown, by insertable connection thereof within the splined axial recess 44.

In a practical mechanical operating sense, in order for the rectilinear-to-rotary motion and power transmittal to be smoothly driven, as above described, it is necessary to provide generous tolerances for insertable fitting of the rotary elements which thereby incorporates a certain amount of lost motion into the mechanically practical operational aspects of the power actuator 12 which in turn provides enough mechanical play to enable a hydraulically adjusted valve set accomplished thereby, under operational fluid flow pressure and mechanical vibrational factors, to migrate off set and in remote control of cooling system valves for naval nuclear power plants and the like such migrations off set can produce significant operational problems.

In order to eliminate the potential for, and problem of, remote valve control migration off set once adjusted by means of utilizing the power actuator 12, the same has been improved by mechanically cooperative incorporation therewith of a lost motion arrester 14 which is a timing gear assembly comprised of a simple circular rack 46 and pinion 48 that functions in close tolerance coincidental intermeshing rotary tracking of the eccentrically driven motion converting rotor drive lug 38 displacement during hydraulically driven double faced piston 20 rectilinear displacement so as to allow smooth mechanical operation of the power actuator 12 in mechanical accommodation of the lost motion action thereof during piston 20 displacement to accomplish valve adjustment, but upon any valve adjustment set stop instantaneously provides in coupled combination with the power actuator 12 a positive mechanical lock and hold function in arresting any tendency for lost motion off set migration as aforesaid.

The circular rack 46 is held in a fixed relationship with respect to the pinion 48 by compressive communication thereof against the power actuator body block 16 through combined means of the circular rack retaining collar 50 having a circular rack receiving recess 52 to receive and accurately hold the circular rack 46 in fixed position once adjusted by means of compression lock with retaining collar compression screws 54 threadably connecting to the body block 16. On the other hand, the pinion 48, fixed to the rotor pin 56 by means of the pinion gear retaining collar 58, is connected to the oscillatable valve stem coupling 42 through the motion converting rotor 36 linkages previously described and connectably moves therewith in coincidental intermeshed rotary tracking displacement communication with the fixed circular rack 46 in the manner previously described only on displacement of the double faced piston 20, however, to be more completely detailed on discussion of FIGS. 5 through 7 hereinafter.

Figure 2:
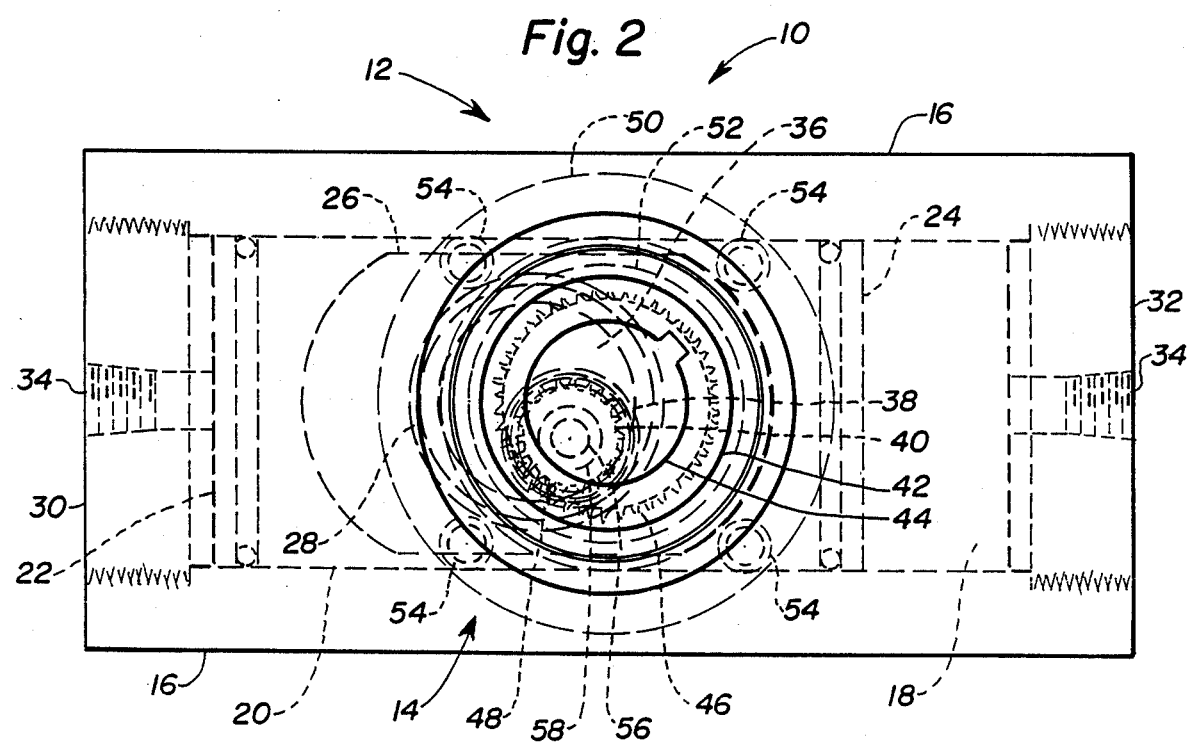
FIG. 2 is a rear elevation view of the improved power actuator with lost motion arrester.

The rear elevation view of the improved power actuator with lost motion arrester 10 shown in FIG. 2 provides a clearer view of the mechanical configuration relationships of the lost motion arrester 14 and the oscillatable valve stem coupling 42 which is set lock by the positive mechanical lock and hold function of said lost motion arrester 14 once valve set is accomplished.

Figure 3:
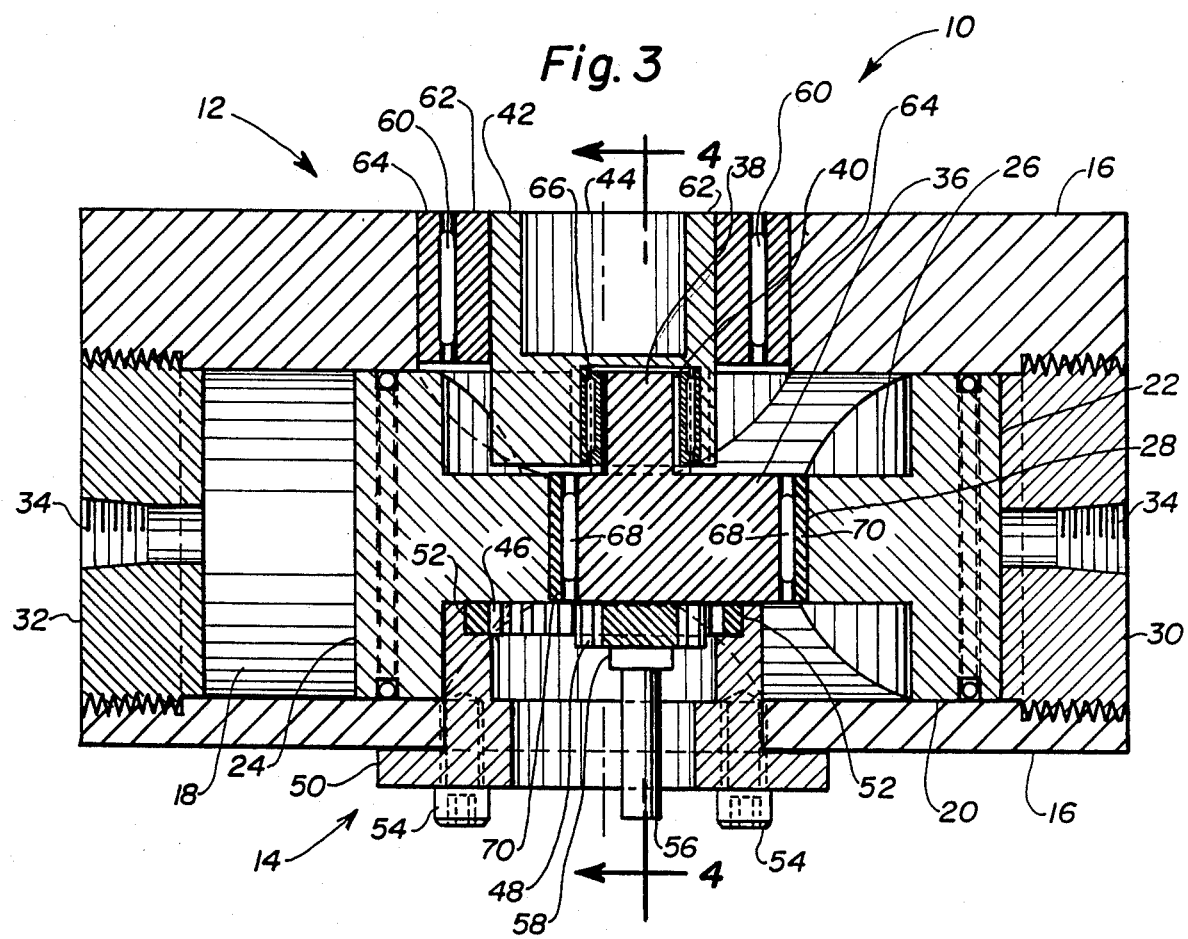
FIG. 3 is a horizontal sectional view of the improved power actuator with lost motion arrester as shown in FIG. 1 and seen along the line 3—3 thereof.
Figure 4:
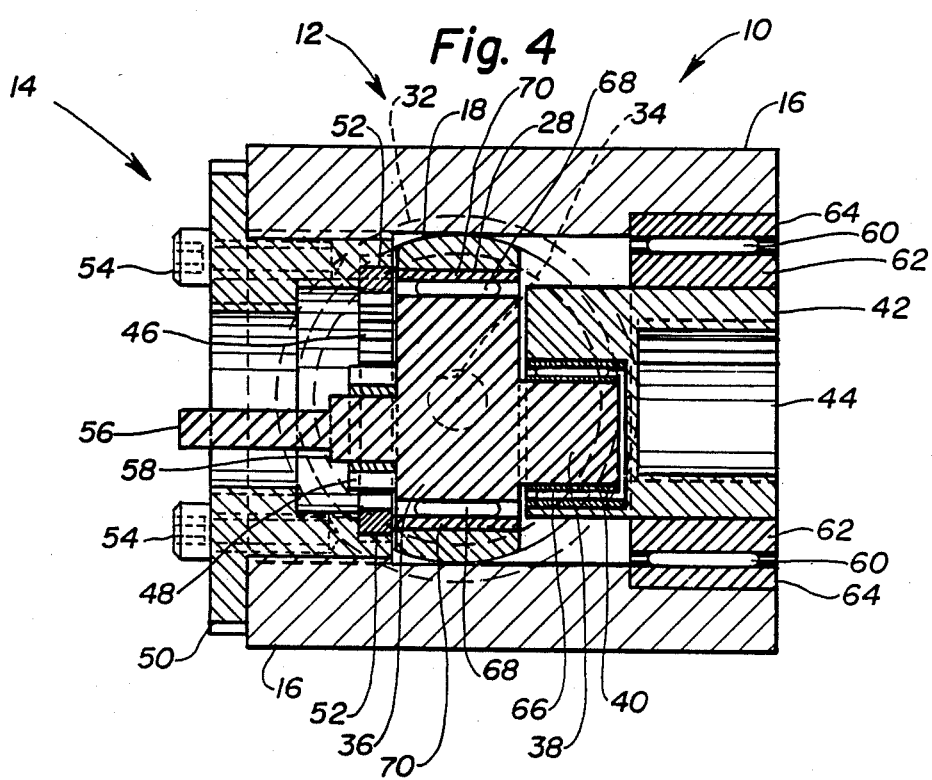
FIG. 4 is a vertical sectional view of the improved power actuator with lost motion arrester as shown in FIG. 3 and seen along the line 4—4 thereof.

Considering concurrently the improved power actuator with lost motion arrester 10 illustrations shown in FIGS. 3 and 4, being respectively a horizontal sectional view thereof as seen along line 3—3 of FIG. 1 and a vertical sectional view as seen along the line 4—4 of FIG. 3, wherein are detailed additional structural relationships of the power actuator 12 and lost motion arrester 14 assemblies. As more clearly shown in both FIGS. 3 and 4, the oscillatable valve stem coupling 42 having the splined axial recess 44 adapted to receive and retain in secure detachable attachment therewithin a valve stem, not shown, is rotatably mounted in said body block 16 by means of a valve stem coupling roller bearing 60 rotatably operable between the valve stem coupling bearing race 62 and the body block bearing race 64 which enables the oscillatable valve stem coupling 42 to rotate about the fixed axis of attachment to a valve stem when driven by the eccentric rotary motion of the motion converting rotor drive lug 38 within lug bearing 66 as the motion converting rotor 36 rotating within the motion converting roller bearing 68 carried by the piston web bearing race 70 translates rectilinear motion on longitudinal displacement of the double faced piston 20 to oscillatory motion in rotation of said oscillatable valve stem coupling 42. As the foregoing motion translation takes place, and only when initiated and driven by double faced piston 20 hydraulic displacement, as the power actuator 12 operates and adjusts the remote valve setting by means of lost motion rotary movement translated to the valve stem through the oscillatable valve stem coupling 42, the rotor pin 56 with pinion 48 concurrently traces a close-tolerance intermeshed gear tooth mechanical displacement about the fixed circular rack 46 which corresponds to the oscillatable valve stem coupling 42 displacement and when piston 20 displacement upon adjustment set of the valve is stopped the pinion 48 and circular rack 46 close-tolerance intermeshed gear tooth structure instantaneously provides in coupled combination with said power actuator 12. assembly a positive mechanical lock and hold valve set function in arresting the lost motion action through which operational adjustment and set of the valve position was accomplished by means of the actuator 12 mechanism.

Figure 5:
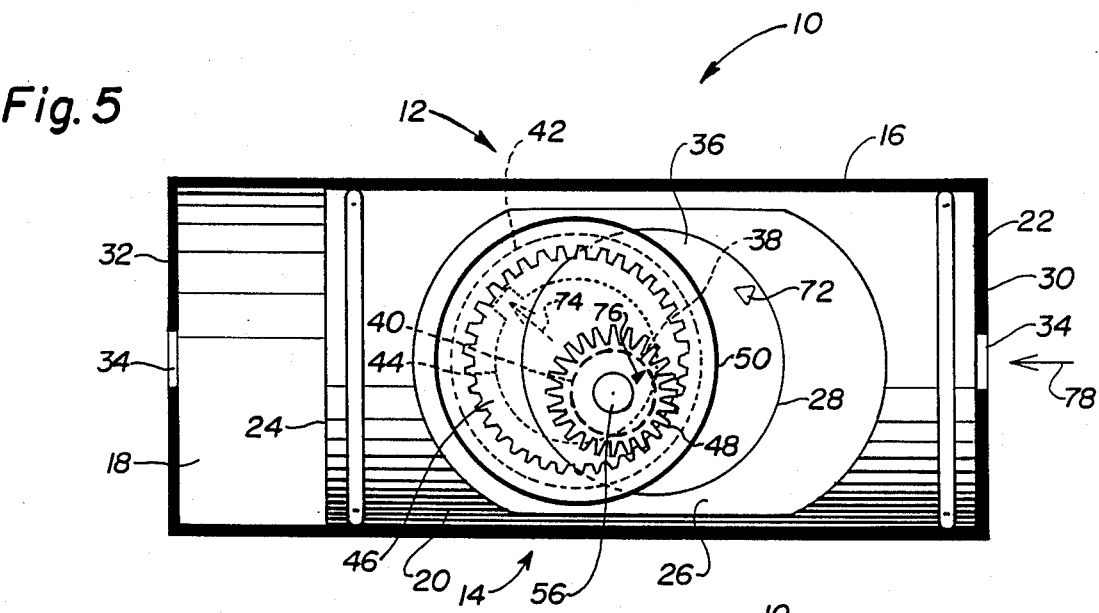
FIGS. 5 through 7 are diagrammatic front elevation views of the relative sequential positions of the lost motion arrester during one full stroke quarter-turn cycle in a right-to-left displacement as viewed in FIG. 1.
Figure 6:
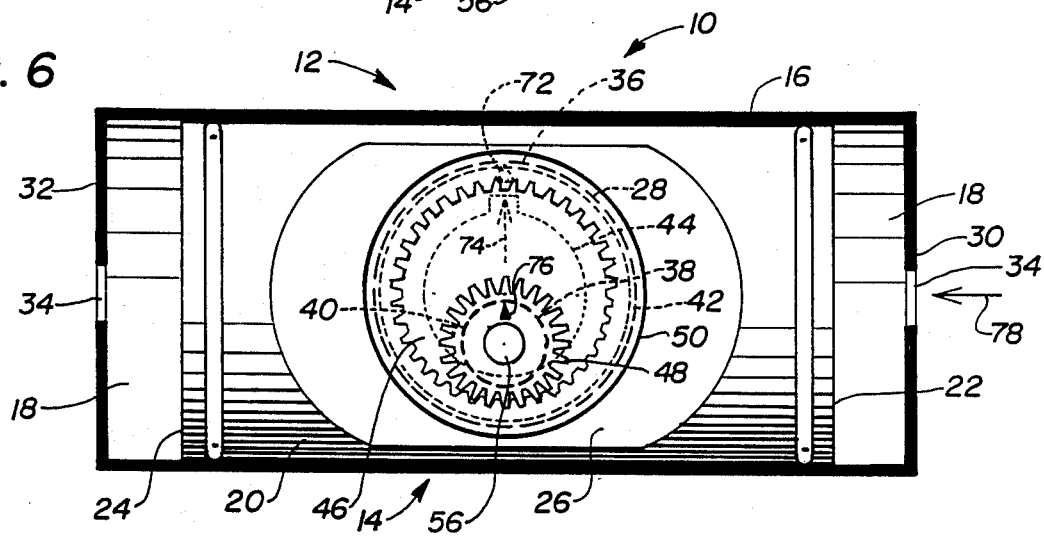
Figure 7:
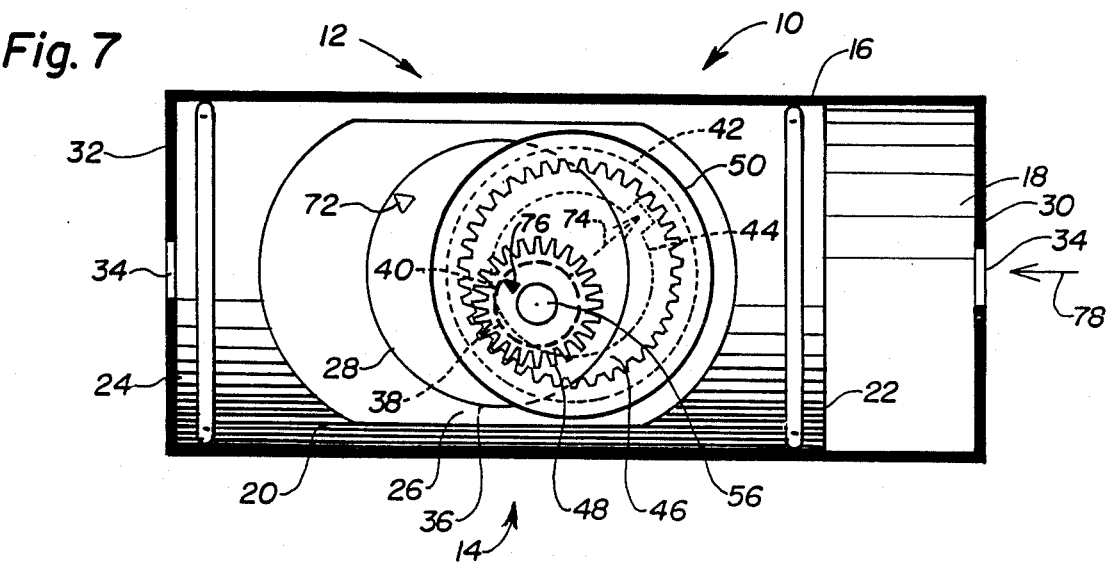

Considering now the diagrammatic front elevation views, and relative sequential positions, of the principal operational, output, and set lock components of the improved power actuator with lost motion arrester 10 during one full stroke quarter-turn cycle thereof in a right-to-left double faced piston 20 displacement as shown in FIGS. 5 through 7 inclusive. For purpose of greater clarity in understanding the relative motions of the motion converting rotor 36 with respect to the oscillatable valve stem coupling 42 and in particular the splined axial recess 44 thereof, both in conjunction with the rotar pin 56 and pinion 48 assembled thereto, each of the foregoing components has been provided with an index mark being respectively motion converting rotor arrow 72, oscillatable valve stem coupling arrow 74, and rotor pin/pinion arrow 76, wherein it is understood as previously described that the circular rack 46 relative to the foregoing components, being stationarily affixed to the body block 16, is static. The direction of flow of pressurized hydraulic fluid to impart linear displacement to piston 20 is indicated by hydraulic fluid arrow 78.

The view shown in FIG. 5, with piston 20 displacement fully to the right, represents the valve full-close position. It will be noted that the motion converting rotor arrow 72 and rotor pin/pinion arrow 76 are indexed on alignment and the oscillatable valve stem coupling arrow 74 is indexed at a 90-degree angle counterclockwise thereto. The teeth of the pinion 48 are intermeshed within the gear tooth recesses of the circular rack 46 of the lost motion arrester 14 which maintains the rotor pin 56, and thus the mechanically communicating oscillatable valve stem coupling 42, in a set lock valve full-close position. As pressurized hydraulic fluid is admitted to the right piston chamber, being indicated by hydraulic fluid flow arrow 78, the double faced piston 20 moves to the left and the linear displacement thereof translates to rotary motion through the motion converting rotor 36 moving counterclockwise, which eccentrically drives the motion converting rotor drive lug 38 to impart an equivalent clockwise rotary movement to the oscillatable valve stem coupling 42 and bring the two on alignment at the valve half-open position shown in FIG. 6 by the respective index arrow 72 and 74 alignments. It will also be noted that the rotor pin/pinion arrow 76 is on alignment with the valve half-open position, indicating the coincident pinion 48 and rotor pin 56 clockwise rotary displacement consequent from direct-drive communication with the motion converting rotor 36, wherein the pinion 48 moves in intermeshed communication with the circular rack 46 gear tooth recesses of the timing gear assembly lost motion arrester 14 to thereby constantly and continually provide a tracking set lock capability to hold valve set instantaneous with piston 20 hydraulic displacement stop. It should also be noted that the critical set lock valve adjust hold function is when the valve is adjustably set to the half-open position.

Continued hydraulically driven right-to-left displacement of the piston 20, to the valve full-open position as shown in FIG. 7, again brings the motion converting rotor arrow 72 and rotor pin/pinion arrow 76 into indexed alignment 90-degrees counterclockwise to the initial valve full-close position as originally shown in FIG. 5, with the oscillatable valve stem coupling arrow 74 indexed at a 90-degree angle clockwise thereto and the pinion 48 in valve adjusted intermeshed set lock holding with the circular rack 46 gear tooth recesses of the timing gear assembly lost motion arrester 14.

On pressurized hydraulic fluid driven return of the piston 20 from left-to-right to the original start position, the relative motions of the various component assemblies as above described are reversed.

Although the invention has been herein shown and described in what is conceived to be the most practical and preferred embodiment, it is recognized that departures may be made therefrom within the scope of the invention, which is not to be limited to details disclosed herein but is to be accorded the full scope of the claims so as to embrace any and all equivalent apparatus and devices, and it is to be understood that variations in arrangements and proportions of parts may be made within the scope of the appended claims.

I claim:

1. An improved power actuator with lost motion arrester for converting rectilinear motion to oscillatory motion to be employed in coupled use with a rotary device for accomplishing remote control adjustment set and adjustment set hold thereof, comprising in combination a body block provided with a longitudinal cylindrical bore adapted to receive a double faced piston reciprocally mounted therewithin said double faced piston having a right piston face and a left piston face connectably joined by an intermediate interconnecting means having a centrally intermediate symmetrically disposed opening therethrough along an axis normal to that of said cylindrical bore, an oscillatable valve stem coupling rotatably mounted in said body block at an axis normal to that of said cylindrical bore, a rotor rotatably mounted in the opening of said connecting means said rotor being operatively connected to said oscillatable valve stem coupling about an axis parallel thereto and adapted to cooperatively rotate whenever said piston is moved, a rotor pin connecting said oscillatable valve stem coupling and said rotor and positioned eccentrically to their axes of rotation, and a lost motion arrester comprised of a circular rack and pinion timing gear assembly operatively assembled to said body block and said rotor pin and adapted to cooperatively displace whenever said piston is moved and automatically set hold said oscillatable valve stem coupling in a set locked position of adjustment whenever said piston is stopped.

2. The improved power actuator with lost motion arrester according to claim 1 wherein said circular rack arrester is adjustably affixed by a compression collar means in a static disposition upon said body block opposite to said oscillatable valve stem coupling and on axial alignment therewith.

3. The improved power actuator with lost motion arrester according to claim 1 wherein said pinion is affixedly assembled upon said rotor pin.

4. The improved power actuator with lost motion arrester according to claim 1 additionally including means for reciprocating said piston.

5. The improved power actuator with lost motion arrester according to claim 1 wherein said rotary device is a rotary flow control valve.

* * * * *